US007378756B2

(12) United States Patent
Singer et al.

(10) Patent No.: US 7,378,756 B2
(45) Date of Patent: May 27, 2008

(54) BATTERY BACKUP ELECTRIC PLUG WITH FEMALE PLUG

(76) Inventors: Troy W. Singer, 205 Lakecrest Dr., Tavares, FL (US) 32778; Kellie Singer, 205 Lakecrest Dr., Tavares, FL (US) 32778

( * ) Notice: Subject to any disclaimer, the term of this patent is extended or adjusted under 35 U.S.C. 154(b) by 0 days.

(21) Appl. No.: 11/481,978

(22) Filed: Jul. 6, 2006

(65) Prior Publication Data

US 2008/0009177 A1 Jan. 10, 2008

(51) Int. Cl.
*H02J 9/00* (2006.01)

(52) U.S. Cl. .......................... 307/64; 307/80; 307/140; 307/150; 439/490; 439/651

(58) Field of Classification Search .................. 307/64, 307/80, 140, 150; 439/490, 651
See application file for complete search history.

(56) References Cited

U.S. PATENT DOCUMENTS 4,749,908 A * 6/1988 Stifter ......................... 315/86
5,138,185 A * 8/1992 Weinstock ................... 307/66
D336,144 S 6/1993 Galati
5,616,968 A * 4/1997 Fujii et al. ..................... 307/66
5,825,648 A * 10/1998 Karnowski ................... 700/82
5,874,788 A 2/1999 McCartney
6,274,949 B1 * 8/2001 Lioux et al. .................. 307/64
6,288,455 B1 * 9/2001 Fujita .......................... 307/64
6,380,852 B1 * 4/2002 Hartman et al. ............ 340/521
6,532,195 B1 3/2003 Head

* cited by examiner

*Primary Examiner*—Gary F. Paumen

(57) ABSTRACT

A plug which is attached to a power cord of an appliance, such as a clock or an appliance having an internal clock, includes a battery that will supply power to the appliance during a failure of utility power whereby the clock associated with the plug need not be reset after restoration of power. The plug is interposed between the plug of the appliance associated therewith and the source of utility power.

2 Claims, 1 Drawing Sheet

BATTERY BACKUP ELECTRIC PLUG WITH FEMALE PLUG

TECHNICAL FIELD OF THE INVENTION

The present invention relates to the general art of power supplies, and to the particular field of backup power supplies.

BACKGROUND OF THE INVENTION

Many AC powered electronic devices use a microprocessor to maintain the operation of a time of day clock. Using its time base, or perhaps the 60 Hz AC frequency, the microprocessor uses internal counters to maintain the current day, hour, minute and second. As a result of this counter activity, the microprocessor must have a supply of power in order to maintain the clock.

When a traditional AC powered electronic device encounters an AC power interruption, the clock will not continue to function because the microprocessor is no longer receiving the power it needs to execute the time of day clock operation. This is unsatisfactory because it is important for many electronic devices to maintain the current time during a power interruption. In an executing mode (i.e., in order to maintain the time of day clock), the microprocessor draws power. If the power draw is excessive, batteries are relied upon to maintain the operation of the clock during the power interruption. This results in a serious drawback in consumer electronic devices because consumers cannot be relied upon to install backup batteries and even then, they do not usually replace the batteries before the energy reserve is completely depleted. Therefore, it is desirable to provide a simple, cost effective device to backup a time of day clock in the event of a power interruption.

One approach has been to slow down the operation of the microprocessor so as to reduce its power consumption. Since most consumer electronic devices use CMOS microprocessors whose power consumption is directly proportional to the frequency of operation, slowing down the microprocessor reduces the current draw. If the microprocessor is sufficiently slowed, the current draw can be lowered enough to allow a simple capacitor-based power supply to provide a temporary supply of power during a power interruption. Unfortunately, not all microprocessors have the capability to reduce their clock speed. Additionally, even at slow speeds, the microprocessors current draw is large enough to require large, expensive capacitors (commonly called 'super caps') to supply the power for the backup function.

Accordingly, backup power systems are increasingly used for applications, such as computer, security, data processing and communications equipment to avoid interruptions resulting from a primary AC power source. Various arrangements have been employed to provide a backup or standby power supply.

Furthermore, microwave ovens, ranges, video cassette recorders, and many other appliances include a digital clock which displays the time of day. Power for the clock typically is obtained from the AC power line which supplies power to other appliance components. If the AC power is lost, even for a brief instant, the clock must be manually reset. Although having to reset the clock is not necessarily difficult or time consuming, it can be a nuisance.

While the operation of many electronic devices depends on a clock, the basic operation of electronic clocks themselves is often interrupted when there is a power failure. If the consumer has not replaced a backup battery in the clock itself, the consumer will be required to reset all such clocks after a power interruption. This can be annoying.

Therefore, there is a need for a backup power supply for a clock or for an appliance incorporating a digital clock which is tolerant to short power outages so that the clock does not necessarily need to be reset manually after a brief, e.g., 20-30 seconds, power outage. There is a further need for such a device that does not add significant costs to an appliance.

While the inventor is aware of several backup power supply systems, these known arrangements have several disadvantages, including complexity, expense and unreliability. Furthermore, many of the known arrangements require modifications and/or direct wiring interconnections within the power supply circuit of the supported device.

Therefore, there is a need for an external backup power system capable of simply and effectively supplying DC (direct current) backup power to a supported device without requiring any modification of the supported device. It is important to provide such backup power supply that can be used with a various devices and that is inexpensive.

SUMMARY OF THE INVENTION

The above-discussed disadvantages of the prior art are overcome by a plug which is attached to a power cord of an appliance, such as a clock or an appliance having an internal clock. The plug includes a battery that will supply power to the appliance during a failure of utility power. The battery of the plug is rechargeable and recharges during the periods when utility power is operating.

The plug containing an external DC power supply of the present invention is inexpensive and is capable of reliably, effectively and efficiently supplying power to an AC power supply of a supported system when a primary AC operating supply drops below a predetermined and adjustable minimum voltage. Furthermore, the power supply of the present invention will provide an external DC power supply capable of reliably, effectively and efficiently supplying backup power to an AC power supply of a supported system without requiring any special wiring or modification of the supported AC power supply using only an AC input plug for connection to the supported system and will not effect normal operation when backup power is not needed and does not need any special switching to be activated. After a failure of the main power source, the clock associated with the plug of the present invention need not be reset upon restoration of that utility power.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 2:
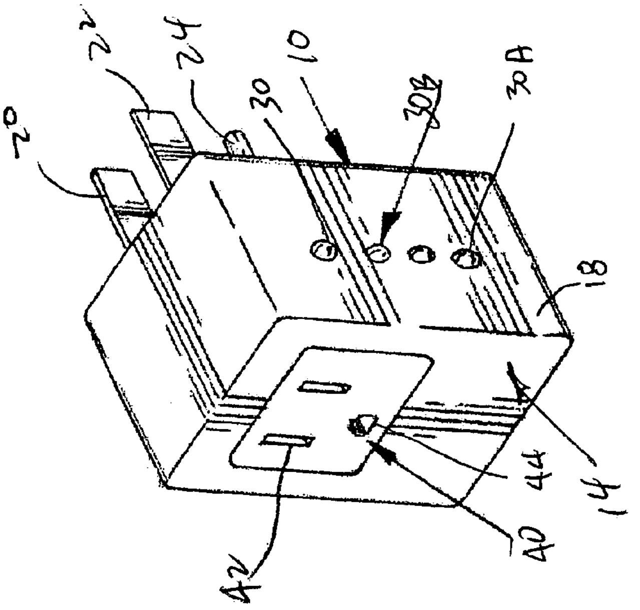
FIG. 2 is a front perspective view of a backup power supply plug embodying the present invention.
Figure 1:
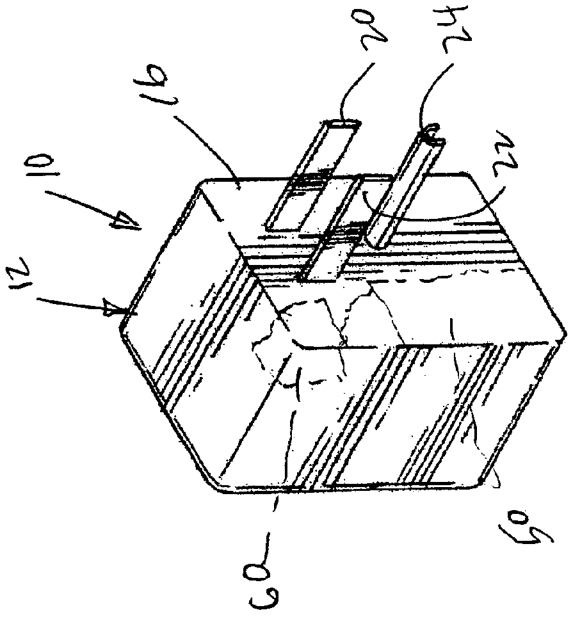
FIG. 1 is a rear perspective view of a backup power supply plug embodying the present invention.

Referring to the figures, it can be understood that the present invention is embodied in a plug 10 which contains. Plug 10 comprises a housing 12 which has a first surface 14 which is front surface when the housing is in use, a second surface 16 which is a rear surface when the housing is in use and a third surface 18 which is a side surface when the housing is in use.

A plurality of electrical connector prongs 20 and 22 are located on the second surface and a grounding electrical prong 24 is also located on the second surface. A plurality of condition indicator lights 30 are located on the third surface and can be LEDs or the like. An electrical socket 40 is located on the first surface and includes a plurality of prong accommodating holes 42 and a grounding plug 44.

A rechargeable battery 50 is located in the housing. Circuitry 60 is also located in the housing. Circuitry 60 electrically connects the battery to the electrical connector prongs and to the indicator lights. The circuitry senses power applied to electrical prongs 20 and 22, as from a source of utility power, or the like, and activates the battery when power applied to the electrical connector prongs drops below a preset level to apply power from the battery to the electrical connector prongs when the power applied to the electrical prongs drops below the preset level. The activation of the battery can be accomplished by electrically connecting the battery to the prongs. At least one indicator light 30A of the indicator lights being activated when the battery is activated to supply power to the electrical connector prongs. A second indicator light 30B is connected to the battery to indicate power level in the battery.

The circuitry for detecting a power failure and placing the battery of plug 10 online is known to those skilled in the art. The exact details of this circuitry are not important to the present invention and will not be claimed. As such, these details will not be discussed. Use of plug 10 can be understood from the teaching of the foregoing disclosure and thus will only be briefly discussed. The plug of an appliance is plugged into plug 10 and plug 10 is then plugged into a source of utility power. In the event of a power failure, the battery in plug 10 supplies power to the appliance whereby the clock of the appliance will not need to be reset after restoration of utility power.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A plug containing a backup power supply comprising:

A) a housing having (1) a first surface which is a front surface when the housing is in use, (2) a second surface which is a rear surface when the housing is in use, and (3) a third surface which is a side surface when the housing is in use;

B) a plurality of electrical connector prongs on the second surface;

C) a grounding electrical prong on the second surface;

D) a plurality of condition indicator lights on the third surface;

E) an electrical socket on the first surface, the electrical socket including a plurality of prong accommodating holes and a grounding plug;

F) a rechargeable battery in the housing; and

G) circuitry in the housing, the circuitry electrically connecting the battery to the electrical connector prongs and to the indicator lights, the circuitry sensing power applied to the electrical prongs and activating the battery when power applied to the electrical connector prongs drops below a preset level to apply power from the battery to the electrical connector prongs when the power applied to the electrical prongs drops below the preset level, at least one of the indicator lights being activated when the battery is activated to supply power to the electrical connector prongs, a second indicator light being connected to the battery to indicate power level in the battery.

2. A method of providing uninterrupted power to an electrical appliance comprising:

A) providing a plug containing a backup power supply comprising:

a housing having a first surface which is front surface when the housing is in use, a second surface which is a rear surface when the housing is in use, and a third surface which is a side surface when the housing is in use; a plurality of electrical connector prongs on the second surface; a grounding electrical prong on the second surface; a plurality of condition indicator lights on the third surface; an electrical socket on the first surface, the electrical socket including a plurality of prong accommodating holes and a grounding plug; a rechargeable battery in the housing; and circuitry in the housing, the circuitry electrically connecting the battery to the electrical connector prongs and to the indicator lights, the circuitry sensing power applied to the electrical prongs and activating the battery when power applied to the electrical connector prongs drops below a preset level to apply power from the battery to the electrical connector prongs when the power applied to the electrical prongs drops below the preset level, at least one of the indicator lights being activated when the battery is activated to supply power to the electrical connector prongs, a second indicator light being connected to the battery to indicate power level in the battery;

B) connecting the plug to a power source using the electrical prongs;

C) connecting an appliance to the plug via the electrical socket on the first surface; and D) using the circuitry to monitor power being applied to the electrical prongs and activating the battery when power applied to the prongs drops below a preset level.

* * * * *